INVENTOR.
Robert C. Russell.
BY Harness, Dickey, Pierce & Hann.
ATTORNEYS.

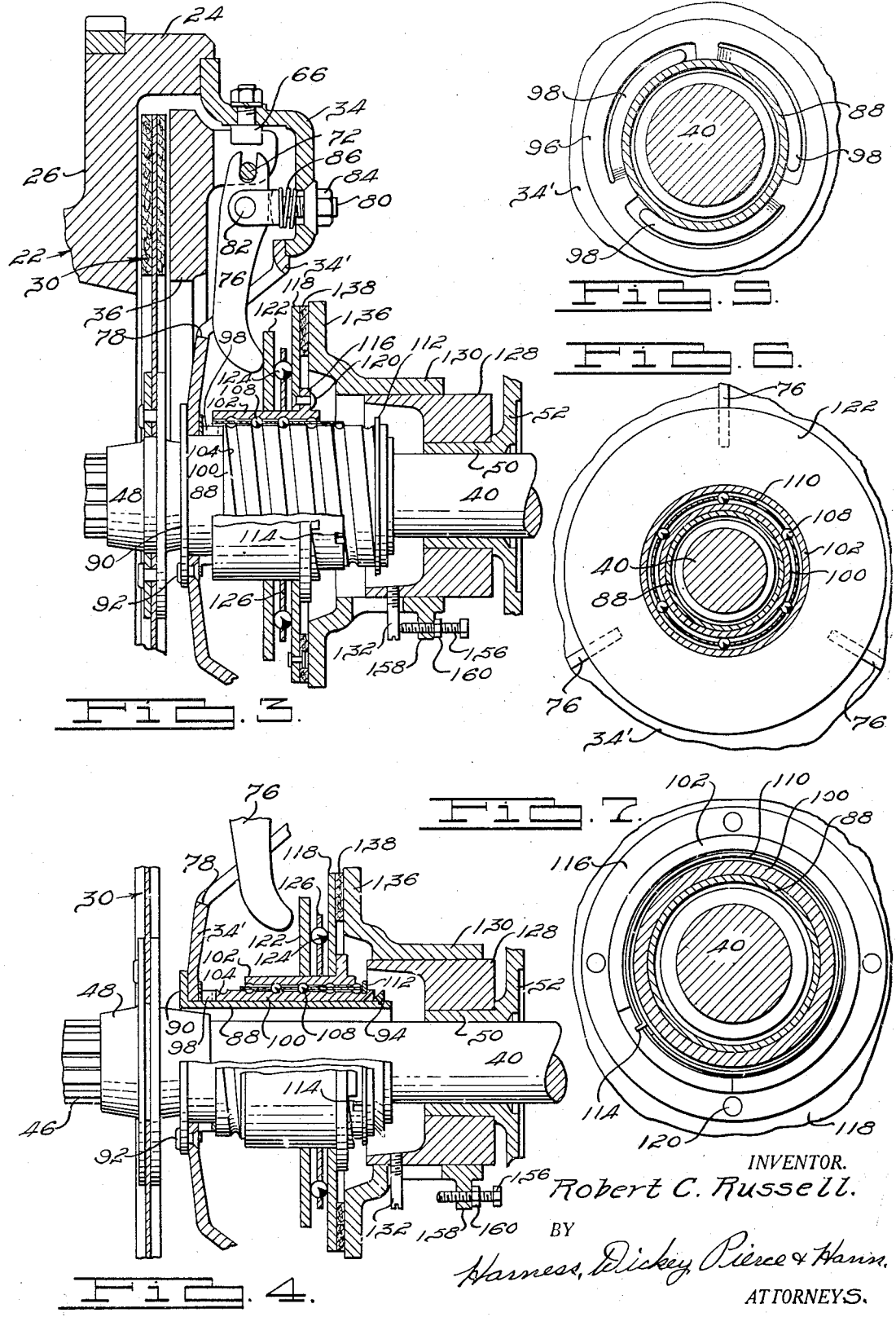

Patented May 12, 1936

2,040,409

UNITED STATES PATENT OFFICE 2,040,409

SERVO MECHANISM

Robert C. Russell, Detroit, Mich.

Application December 1, 1933, Serial No. 700,423

15 Claims. (Cl. 192—36)

This invention relates to servo mechanism and particularly to such mechanism as is applicable for use in connection with motor vehicles for enabling operating parts thereof such, for instance, as the clutch, brake or other devices, to be actuated with a minimum amount of physical effort on the part of the operator.

Objects of the invention are to provide a servo mechanism that is simple in construction, efficient in operation and economical to manufacture; to provide a servo mechanism particularly designed to resist the shock of abnormal return movement of the various parts thereof to normal inoperative position; to provide a servo mechanism that will not jam in operation; and to provide a servo mechanism in which the effect of inertia of the moving parts thereof is reduced to a minimum.

Other objects are to provide a servo mechanism including a pair of relatively rotatable members adapted for relative longitudinal movement upon relative rotation, one of the members being normally urged for equal rotation with a rotatable part by frictional connection thereto; to provide a servo mechanism including a pair of relatively rotatable and longitudinally movable members one of which is mounted for relative rotation with respect to a rotatable member and is provided with associated resilient means constantly urging it into frictional association with the rotatable part so as to rotate therewith; to provide a servo mechanism including a pair of relatively rotatable members adapted to be moved longitudinally with respect to each other upon relative rotation, one of the members being normally urged into frictional engagement with the rotatable part for equal rotation therewith and the other of said members having a frictional means associated therewith normally out of engagement therewith but engageable therewith to effect operation of the servo mechanism; to provide a servo mechanism including inner and outer sleeves and associated interposed bearing members adapted to cause relative longitudinal displacement of one with respect to the other upon relative rotation therebetween, one of the sleeves being mounted upon a relatively rotatable member and resiliently urged toward a predetermined axial position with respect thereto, together with frictional means associated with the other of said sleeves whereby to enable relative rotation to be effected between the two sleeves; to provide a servo mechanism including a pair of relatively rotatable and longitudinally movable members, both of which are rotatably mounted; and to provide a servo mechanism which includes a pair of relatively rotatable and longitudinally movable members, one of which is normally urged to a predetermined axial position under the influence of resilient means but is longitudinally movable in opposition to such resilient means under the influence of abnormal forces to which the servo mechanism may be subjected.

Further objects are to provide a clutch and associated servo mechanism of novel construction; to provide a novel combination of a clutch and a servo mechanism; and to provide a clutch and associated servo mechanism in which relative movement may occur between parts of the servo mechanism without causing the servo mechanism to function in a clutch operative sense.

The above being among the objects of the present invention, the same consists in certain novel features of construction and combination of parts to be hereinafter described with reference to the accompanying drawings, and then claimed, having the above and other objects in view.

In the accompanying drawings which illustrate suitable embodiments of the present invention and in which like numerals refer to like parts throughout the several different views:

Fig. 4 is a fragment of a view similar to that illustrated in Figs. 2 and 3 and illustrating the positions which parts of the servo mechanism may assume under abnormal conditions.

Fig. 5 is a sectional view taken on the line 5—5 of Fig. 2.

Fig. 6 is a sectional view taken on the line 6—6 of Fig. 2.

Fig. 7 is a sectional view taken on the line 7—7 of Fig. 2.

Fig. 8 is a fragment of a view similar to that in Figs. 2, 3 and 4 and illustrating a modification in the form of the servo clutch actuating mechanism.

Figures 1, 2, 3:
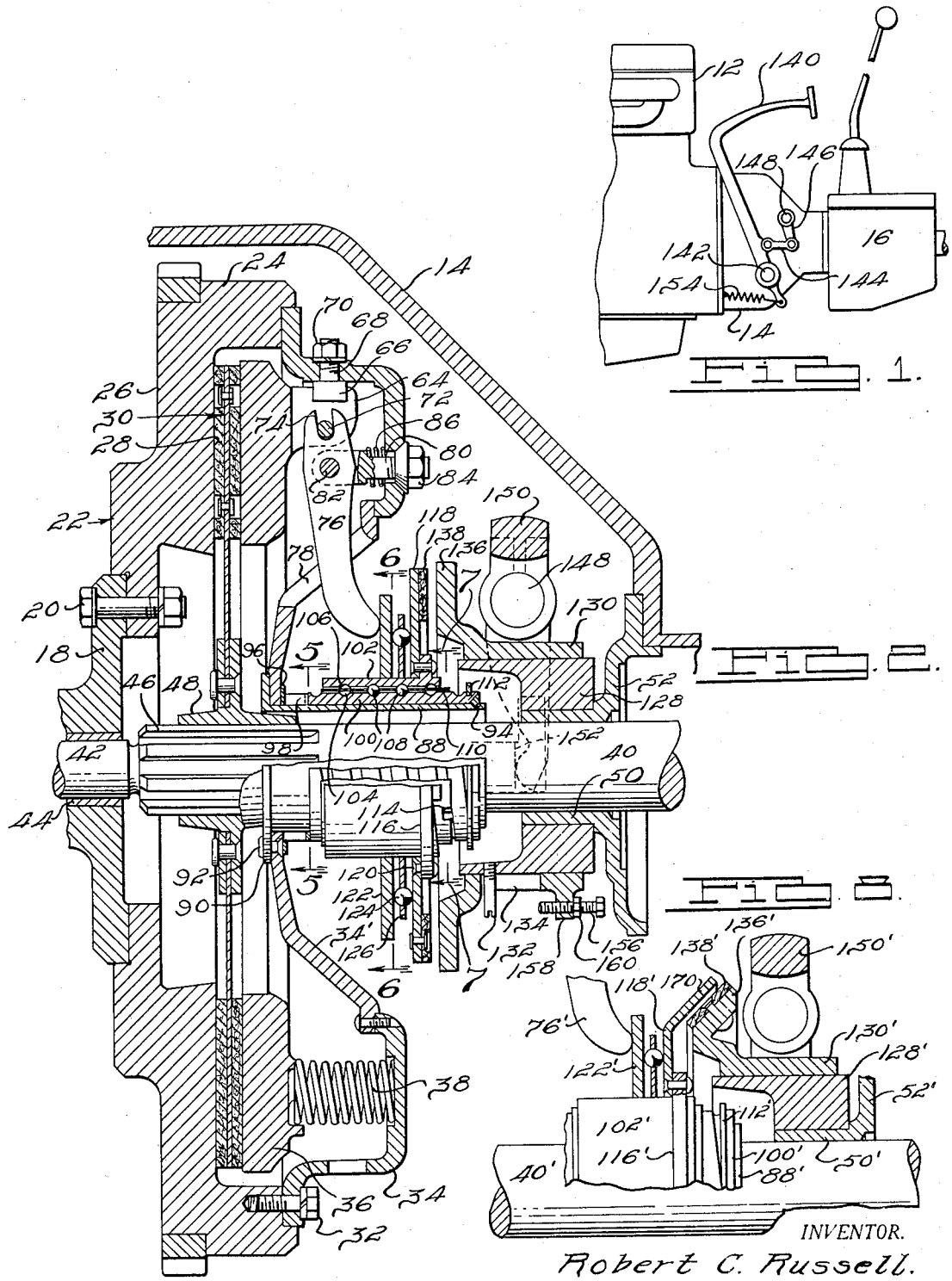
Fig. 1 is a fragmentary side elevational view of a power plant unit for a motor vehicle including a portion of the engine, the clutch and the transmission thereof.
Fig. 2 is an enlarged, partially broken vertical sectional view taken axially through the clutch indicated in Fig. 1 and showing the clutch in engaged position and as being provided with a servo mechanism constructed in accordance with the present invention.
Fig. 3 is a fragment of a view similar to that in Fig. 2 but illustrating the position of the clutch and servo mechanism when the clutch is in disengaged position.

While the servo mechanism forming the subject-matter of the present invention is adaptable for use in connection with a relatively large number of devices, it is particularly adapted for use in connection with the clutch or brakes of a motor vehicle and, accordingly, as a means for illustrating one of its applications it is shown in the accompanying drawings as adapted to operate the clutch of a motor vehicle. The particular mechanism herein shown and described is an improvement on the construction shown and described in my Letters Patent of the United States No. 1,967,563 on Improvements in clutches, granted July 24, 1934.

The main elements of the illustrative embodiment of the present invention herein shown are similar to the same elements shown and described in one modification of my patent above referred to and, while it is to be understood that the construction shown and described in my patent above referred to operates in a satisfactory and acceptable manner, I have found that under certain abnormal conditions of operation difficulties may arise in the operation of the structure there disclosed which difficulties are eliminated by the mechanism provided in accordance with the present invention. I have found that in the structure disclosed in my patent above referred to, where the servo mechanism is applied to clutches of unusually high capacity, if the operator of the clutch allows his foot to slip off the control pedal while the clutch is in fully disengaged position, the extremely high pressure of the clutch springs will act so suddenly and forcefully on the servo mechanism as to return the outer member of the servo mechanism toward normal inoperative position with such great speed that the shock of stopping this member subjects the mechanism to excessive strain, and in some cases is liable to cause it to become jammed. An equivalent condition may occur where the servo mechanism is applied to operate any other device actuated in one direction by spring pressure. While such occurrences are comparatively rare and may not cause any damage in any case, there is the possibility that such damage may arise and, accordingly, by the practice of the present invention any possibility thereof is eliminated entirely.

Referring now to the accompanying drawings, there is indicated in Fig. 1 a fragment of the usual type of unitary power plant provided for motor vehicles and which includes an engine 12 having secured to its rear end a clutch housing 14 enclosing a suitable clutch mechanism and in turn to the rear end of which is secured the usual transmission or change speed gearing unit 16.

The particular type of clutch employed within the casing 14 to transmit power from the engine 12 to the transmission unit 16 is immaterial as far as the present invention is concerned, the particular clutch shown by way of illustration being of a conventional spring packed single dry disc type of the following construction. Referring now particularly to Fig. 2, it will be noted that the rear end of the crank shaft for the engine 12 is provided with a radial flange 18 upon which is mounted and to which is secured by means of bolts 20 the usual engine fly wheel 22 the rim 24 of which projects rearwardly beyond the web 26 thereof. The rear face of the fly wheel web 26 is formed to provide a smooth annular radially extending face 28 against which the clutch driven disc indicated generally at 30 is adapted to be clamped when the clutch is in engaged position. To the rear face of the rim 24 of the fly wheel 22 is secured by screws 32 a clutch cover 34 and positioned between the cover 34 and the driven disc 30 is the usual pressure plate 36 which is constantly urged toward a position to clamp the driven disc 30 against the face 28 by means of a plurality of coil springs 38 maintained under compression between the cover 34 and the pressure plate 36.

The clutch shaft 40 which is provided in axial extension of the engine crank shaft is provided with a reduced forward end 42 which is suitably guided and has bearing in the bearing bushing 44 provided in the crank shaft. Immediately rearwardly of the reduced end 42 the outer surface of the shaft 40 is splined as at 46 for slidable but relatively non-rotatable engagement with the hub 48 of the clutch driven disc 30. The rear end of the shaft 40 is suitably guided and has bearing in the collar 50 formed on a member 52 suitably fixed in the rear end of the clutch housing 14.

The pressure plate 36 is provided with a plurality of equally angularly spaced rearwardly extending pairs of lugs 64 on its rear face adjacent its outer edge, and slidably received between the radially outer edges of each pair of the lugs 64 is a guiding member 66. The members 66 guide the pressure plate 36 for movement axially of the shaft 40 with respect to the flywheel 22 but maintain it against relative rotation with respect to the fly wheel 22. Each of the guiding members 66 is provided with an integral stud 68 which projects radially outwardly therefrom through the clutch cover 34 and on the outer side thereof is provided with a nut 70 to lock it in place. Inwardly of the members 66 each pair of the lugs 64 is provided with a pin 72 projecting transversely therethrough which is received in cooperating slots 74 formed in the outer ends of corresponding clutch throwout arms of fingers 76 which project into the space between corresponding pairs of lugs 64 and which extend in a generally radially inwardly direction therefrom through openings 78 in the clutch cover 34. Each of the arms 76 is pivotally supported from the clutch cover 34 by means of a post member 80 projecting forwardly through the rear face of the clutch cover 34 and having its forward end bifurcated for reception of the corresponding finger 76 which is pivotally secured thereto by means of a pin 82. The axial position of each of the post members 80 is controlled by a nut 84 threaded thereonto and engaging the rear face of the clutch cover 34, and a coil spring 86 maintained under compression between the forward face of the clutch cover 34 and a suitable shoulder formed on the post member 80.

As will be obvious to those skilled in the art, if the radially inner ends of the clutch fingers 76 are urged forwardly under a sufficient pressure, the fingers 76 will be caused to pivot about their pivot pins 82 and their outer ends in moving rearwardly will draw the pressure plate 36 therewith against the force of the springs 38 and thereupon will free the clutch driven disc 30 from clamping relation with respect to the flywheel 22. This relation of parts is indicated in Fig. 3. The mechanism thus far described is conventional and forms no part of the present invention and is indicative only of one form of a clutch mechanism to which the present invention may be satisfactorily applied.

The clutch cover 34 in the present instance is shown as being provided with an inward extension 34' which extends in a generally radially inwardly direction to a point adjacent the outer surface of the rear end of the hub 48 where it has fixed thereto a rearwardly extending sleeve 88 concentric with the shaft 40. For the purpose of fixing the sleeve 88 with respect to the cover portion 34' the sleeve 88 may be provided at its forward end with a radial flange 90 secured to the cover portion 34' by means of rivets 92 or other suitable means. The rear end of the sleeve 88 is provided with an outwardly projecting peripheral bead 94 the forward face of which tapers outwardly and rearwardly as indicated. In the particular instance shown the bead 94 is in the form of a split ring which is snapped into a circumferential recess in the sleeve 88.

Adjacent and surrounding the forward end of the sleeve 88 is a spring member best illustrated in Fig. 5 and shown as including a flat annular portion 96 provided internally thereof with a plurality of concentric arcuate shaped spring fingers 98 attached to the portion 96 at one end only thereof and the free ends of which are bent rearwardly out of the plane of the portion 96. The flat portion 96 of this spring member is adapted to lie in contact with the rear face of the cover extension 34' at the inner margin thereof with the fingers 98 extending in a rearwardly direction and in close proximity to the outer surface of the sleeve 88.

A sleeve-like member 100 is rotatably mounted upon the sleeve 88 between the rear ends of the fingers 98 and the bead 94. The rear edge of the member 100 is beveled for complementary engagement with the outwardly and rearwardly tapered face of the bead 94 and the length of the member 100 is such that when its rear edge contacts with the bead 94 the spring fingers 98 are maintained under a compressive stress. Thus the spring fingers 98 constantly urge the member 100 rearwardly into engagement with the bead 94 and thereby frictionally urge it for equal rotation with the sleeve 88 and consequently the fly wheel 22 or clutch driving member. The tapered conformation of the inter-engaging faces of the bead 94 and member 100 serve to increase the frictional engagement between these parts. The bead 94 therefore not only serves as a stop for limiting rearward travel of the member 100 but additionally serves to frictionally urge it toward equal rotation with the clutch driving member.

Surrounding the sleeve-like member 100 is concentric and slightly spaced relation with respect thereto is a second sleeve-like member 102. The adjacent faces of the members 100 and 102 are provided with opposed thread-like grooves or races 104 and 106 respectively of semi-circular section between which a plurality of ball bearings 108 are received and which not only serve to maintain these members 100 and 102 in concentric relation with respect to each other but also to lock them together for threaded engagement with each other. A relatively thin tubular sleeve 110 received between the opposed faces of the members 100 and 102 is provided with suitable apertures therein for reception of the balls 108 thereby to maintain them in equally angular spaced relation as best illustrated in Fig. 6. This arrangement of parts, as will be observed, provides a structure wherein relative rotation between the members 100 and 102 will effect relative axial displacement of one with respect to the other.

In order to prevent the ball bearing retainer sleeve 110 from becoming materially displaced from its desired normal position, the inner member 100 is provided with a radial abutment 112 adjacent its rear edge which intersects the possible rearward path of travel of the retainer sleeve 110 to thereby limits its movement in a rearward direction by contact therewith. In the particular instance shown the abutment 112 is illustrated as a split ring which is sprung into a complementary peripheral groove formed in the outer surface of the member 100. In order to limit forward movement of the retainer sleeve 110, a radially outwardly extending lug 114 is struck outwardly from the material of the sleeve 110 adjacent the rear end thereof, this lug 114 being adapted to contact with the notched rear edge of the outer member 102 in order to limit relative forward movement of the sleeve 110 with respect thereto.

The outer member 102 is provided with a radially outwardly extending flange 116 adjacent its rear end to which a radially disposed disc 118 is fixed by rivets 120. A disc 122 rotatably surrounds the outer sleeve member 102 in forwardly spaced relation with respect to the disc 118 and is separated therefrom by a plurality of ball bearings 124. The ball bearings 124 are maintained in equally angularly spaced relation and maintained against displacement from their intended location by means of a retainer disc 126 rotatably surrounding the member 102 between the discs 118 and 122 and provided with apertures for receiving the ball bearings 124 therein. As indicated in Figs. 2, 3 and 4, the disc 122 is positioned for engagement with the inner ends of the clutch fingers 76 so that when the disc 122 is moved forward or to the left as viewed in the drawings, along the shaft 40, the inner ends of the fingers 76 will be moved forwardly therewith and will cause the pressure plate 36 to be withdrawn from clamping engagement with the clutch driven disc 30 and thereby place the clutch in disengaged position.

Fixed upon the sleeve 50 supporting the rear end of the shaft 40 is a member 128 having a cylindrical outer surface. A sleeve member 130 is slidably mounted upon the exterior surface of the member 128 and is held against rotation with respect thereto by means of a pin 132 threaded into the member 128 and projecting outwardly through a longitudinally extending slot 134 in the sleeve 130. The forward end of the sleeve 130 is formed to provide a radially extending annular flange or plate 136 which, upon forward movement of the sleeve 130, is adapted for interengagement with the disc 118. A ring 138 of friction material is preferably provided either upon the disc 118 or plate 136 to enhance the frictional characteristics of the engagement of these members, this ring 138 in the present case being shown as attached to the disc 118.

Axial movement of the sleeve 130 together with the plate 136 is controlled through a clutch pedal 140 in the same manner as a conventional clutch 140 is controlled. In other words, the pedal 140 is pivotally mounted as at 142 either on the clutch housing 14 or upon the frame of the vehicle and is connected by a link 144 and arm 146 with a shaft 148 extending transversely through the housing 14. Within the housing 14 the shaft 148 has secured thereto the usual clutch throwout yoke 150 the free ends of the arms of which engage abutments 152 formed on diametrically opposite sides of the sleeve 130. Accordingly, when the clutch pedal 140 is depressed the free ends of the clutch throw-out yoke 150 are moved forwardly and through the abutments 152 urge the sleeve 130 and plate 136 forwardly so as to bring the plate 136 into frictional engagement with the ring 138 secured to the disc 118. The throw-out yoke 150 is normally urged toward inoperative position by springs or other suitable means, the particular means shown by way of illustration including a coil spring 154 which, as indicated in Fig. 1, is maintained under tension between an extension on the pedal 140 below its point of pivot and some suitably fixed point such as the power plant. The outer sleeve member 102 with the parts secured thereto or supported thereby is returned from clutch disengaged toward clutch engaged position by the pressure of the springs 38 acting through the inner ends of the clutch fingers 76.

It will be understood that when the clutch structure above described is in engaged position and rotating, the sleeve members 100 and 102 together with the disc 118 rotate equally with the fly wheel 22 which, of course, is the clutch driving member. The disc 122 will rotate with the sleeve 102 when the clutch is engaged, the disc 122 and ball bearings 124 serving as a thrust bearing between the disc 118 and the inner ends of the clutch fingers 76 so as to enable pressure to be applied thereto without any rubbing action between the fingers 76 and the disc 118.

In the operation of the above device, assuming the parts to be in the relative positions indicated in Figs. 1 and 2 and rotating, if the pedal 140 is depressed against the force of the spring 154 the collar 130 with its plate 136 will be moved forwardly, or to the left as viewed in the drawings, until its forward face contacts with the ring 138 secured to the disc 118. When this occurs the frictional engagement between the plate 136 and the disc 138 will tend to retard rotation of the sleeve member 102 with respect to the sleeve member 100, and as soon as this occurs, because of the screw-like association of these members, the sleeve 102 will be urged forwardly so as to force the disc 122 against the inner ends of the clutch fingers 76. If the depressing movement of the pedal 140 is continued so as to cause the plate 136 to follow up the forward displacement of the ring 138 and disc 118, the sleeve member 102 will be caused to continue its forward movement until the clutch fingers 76 have moved toward or to the position indicated in Fig. 3 at which time the pressure plate 36 has been withdrawn from clamping engagement with the driven disc 30 and thus placed the clutch in disengaged position wherein the driving and driven elements of the clutch are free to rotate independently of each other. It might be noted that although the inner sleeve member 100 is rotatable upon the sleeve 88 it will ordinarily continue to rotate in direct accordance with the sleeve 88 during disengagement of the clutch for the reason that as soon as any pressure is exerted between the member 102 and the clutch fingers 76 such pressure will act to force the sleeve member 100 rearwardly and to build up the frictional engagement between it and the sleeve 88 through engagement of the tapered surfaces at the rear ends of these sleeves. Accordingly, the greater the pressure exerted on the fingers 76 the greater frictional resistance will be set up between the sleeves 88 and 100 to maintain them against relative rotation with respect to each other.

It might appear at first glance that if the operator suddenly advances the member 136 to throw out the clutch, the member 118 and sleeve 102 might be moved forwardly before the sleeve 102 has a chance to rotate on the sleeve 100, thus separating the tapered rear end of the sleeve 100 from the abutment 94 and rendering the servo mechanism inoperative for its intended purpose. Such forward movement under such conditions will occur only if the driving member or flywheel is not rotating, and under such conditions will permit manual disengagement of the clutch which is desirable in such cases, but if the driving member is rotating the inertia of the revolving parts, even in the absence of the spring member 96—98, will insure sufficient relative rotation between the sleeve member 100 against the abutment 94 until the resistance to moving the fingers 76 will act to firmly hold the sleeve member 100 to the abutment 94.

Forward movement of the sleeve 130 and plate 136 is preferably limited so as to eliminate any possibility of any manual pressure being applied to force the plate 136 forwardly at such time that the inner ends of the clutch fingers 76 may have reached the forward possible limit of their travel, for otherwise excessive friction would be set up between the plate 136 and the friction ring 138 which would set up undue heating of these parts due to the slipping between them and consequently might result in the destruction of these parts. One means of eliminating this possibility is indicated in the drawings as including a stop screw 156 threaded into a lug 158 projecting outwardly from the sleeve 130 and in a position to engage the pin 132 fixed to the member 128. The screw 156 is adjustable into the lug 158 and may be locked in adjusted position by means of a lock nut 160. As indicated in Fig. 3, when the sleeve 130 has moved far enough forwardly to bring the screw 156 into contact with the pin 132, the inner ends of the clutch fingers 76 are still short of the limit of their forward possible movement defined by the margins of the corresponding openings 78 in the clutch cover extension 34'.

A feature of this servo mechanism which enables absolute control over the movement of the mechanism which it is actuating in accordance with the position of the control lever, and whether the servo mechanism is applied to a clutch, brake or other device, will be apparent from the following explanation in connection with the clutch structure shown. It will be observed that when the clutch pedal 140 is depressed to move the plate 136 forwardly and the plate 136 is brought into frictional engagement with the ring 138 on the disc 118 so as to cause relative rotation thereof, should the movement of the pedal 140 be stopped at this point the disc 118 will move forward only to such extent as the pressure acting on its through the clutch fingers 76 tending to force it rearwardly balances the frictional drag exerted between the plate 136 and ring 138 multiplied by the mechanical advantage of the thread-like engagement between the sleeves 100 and 102. Because of the mechanical advantage of the thread-like engagement of the members 100 and 102 the amount of friction usually set up between the plate 136 and ring 138 will be unusually low and not sufficient to set up undue heating of the rubbing surfaces thereof even during continuation of such rubbing contact. Should the clutch pedal 140 now be further depressed, the frictional engagement between the plate 136 and ring 138 will be increased causing a further relative rotation of the disc 118 and outer sleeve member 102 with respect to the inner sleeve member 100 and the disc 118 and sleeve member 102 will be caused to move further forwardly until the balanced condition above described will have again become established. In other words, it will be apparent that in order to cause complete disengagement of the main clutch, the pedal 140 must be depressed so as to cause the plate 136 to follow up the forward movement of the ring 138 and disc 118 as these parts move forwardly against the pressure exerted upon them by the clutch fingers 76, until the clutch has been moved to disengaged position. Likewise and for the same reason, the return movement of the mechanism toward clutch engaged position may be just as accurately and progressively controlled as the movement thereof toward clutch disengaged position. Accordingly, engaging and disengaging movements of the clutch may be controlled just as accurately through the servo mechanism herein provided as they could were the servo mechanism not provided and these movements of the clutch controlled entirely by directly applied manual pressure as in conventional constructions, the only difference being in this respect that by the use of this servo mechanism only a small percentage of the manual effort required to operate the clutch is required as compared to the pressure necessary where directly manually controlled.

Should the plate 136 be allowed to return to normal inoperative position at a rate of speed faster than that which the disc 118 and outer sleeve member 102 is capable of equaling, such as may occur where the operator of the clutch is holding the clutch in disengaged position and permits his foot to slip off of the clutch pedal, because of the free rolling engagement between the sleeve members 100 and 102, the rate of rotation of the sleeve member 102 and disc 118 by the time the ring 138 has moved back into contact with the plate 136, will have set up so much inertia in the moving parts, namely, the member 102, the disc 118 and ring 138, that unless otherwise provided for the overcoming of this inertia in the short time necessarily provided might cause damage to the parts involved. This, of course, is more or less an abnormal condition but it is deemed best to guard against it and the servo mechanism herein provided acts to materially reduce the possible ill effect thereof.

Under such circumstances and considering now that the outer sleeve member, together with the disc 118 and ring 138, are being revolved rapidly under pressure from the clutch fingers 76 in an attempt to equal the return speed of the plate 136 which, as is being considered has been returned to the position indicated in Figs. 2 and 4 at a rate of speed faster than can be accomplished by the outer sleeve member 102 and disc 118, the disc 118 will in moving rearwardly due to such rotation, finally bring the ring 138 into contact with the plate 136 while rotating at this relatively high speed. Due to the inertia of these rotating parts and to the mechanical advantage through which this inertia works by reason of the thread-like engagement between the sleeve members 100 and 102, a relatively great pressure will tend to be set up between the plate 136 and the ring 138. When this contact between the plate 136 and ring 138 occurs the ring 138, together with the disc 118 and outer sleeve member 102, is of course stopped against further rearward movement, but will have a tendency to continue to rotate, and with the construction provided will rotate a limited amount due to the fact that in continuing to rotate the pressure exerted between the plate 136 and 138 will be now utilized to force the inner sleeve 100 forwardly against the pressure of the spring fingers 98 and this will cause, as illustrated in Fig. 4, the inner sleeve 100 to actually move forwardly away from the bead 94. This provides a material time element in which to absorb the inertia of the rotating parts mentioned, which time element was lacking in the construction shown and described in my previously filed application above referred to, and thereby reduces the effects thereof to such an extent as to render them of little moment. It may be observed that as the inner sleeve 100 is forced forwardly it is moved out of frictional engagement with the bead 94 on the rear end of the sleeve 88, and under such circumstances the inner sleeve member 100 may actually rotate on the sleeve 88 to increase the aforesaid time element. As soon as the inertia of these rotating parts has been absorbed by the mechanism as explained, the inner sleeve 100 will have been moved rearwardly by the spring fingers 98 again to normal position as indicated in Figs. 2 and 3 and all of the parts in general will have returned to their normal inoperative positions.

It will, of course, be obvious that the interengageable surfaces of the plate 136 and disc 118 need not be of the disc type illustrated in Figs. 1 to 7 inclusive in order to obtain the advantages of the present invention. In fact, where the load to be applied by the servo mechanism is unusually high or the space for the clutch elements of the servo mechanism itself is restricted, a conical form of clutch such as that illustrated in Fig. 8 may be employed. Referring to Fig. 8 in which parts equivalent to the previously described parts are indicated by the same numerals except that they bear a prime mark, it will be noted that instead of making the member 118' in the form of a full disc the outer marginal portion thereof has been bent rearwardly as at 170 so as to provide a frusto-conical inner surface. The portion 136' of the collar 130' is formed complementarily to the inner surface of the portion 170 and its complementary face is provided with a friction facing 138' adapted for direct contact with the inner face of the portion 170. The operation is, of course, identical to that previously described.

Formal changes may be made in the specific embodiment of the invention described without departing from the spirit or substance of the broad invention, the scope of which is commensurate with the appended claims.

What is claimed is:

1. In a servo mechanism, in combination with a rotatable member, a pair of relatively rotatable elements rotatably mounted relative to said member, means frictionally urging one of said elements for equal rotation with said member, resilient means constantly urging said one of said elements toward a predetermined axial position with respect to said member, and frictional means including a pair of bodily shiftable members one of which is adapted for rotation and axial movement with said other of said elements, said pair of members being cooperable with each other to urge said other of said elements toward relative rotation with respect to the first mentioned element, and means for effecting movement of said other of said pair of members in follow-up relation with said one of said pair of members.

2. In a servo mechanism, in combination with a rotatable member, an element axially slidably and rotatably associated with said member, an abutment on said member, means constantly urging said element toward said abutment whereby to normally frictionally lock it thereto for equal rotation therewith, a second element rotatably and axially movable with respect to the first mentioned element and cooperatively associated with the first mentioned element to effect relative axial displacement between them upon relative rotation between them, and friction means cooperable with the last mentioned element for urging it toward relative rotation and therefore axial movement with respect to the first mentioned element, said friction means being arranged in axially follow-up relation with respect to said last mentioned element.

3. In a servo mechanism, in combination with a rotatable member, a sleeve rotatably and axially slidable with respect to said member, means frictionally urging said element toward equal rotation with said member, a second sleeve surrounding the first mentioned sleeve, means interposed between said sleeves causing relative axial displacement between them upon relative rotation between them, and means frictionally associated in axially follow-up relation with the last mentioned sleeve for urging it toward relative rotation with respect to the first mentioned sleeve.

4. In a servo mechanism, in combination with a rotatable member, a sleeve rotatably and axially slidably associated with said member, means for frictionally urging said sleeve toward equal rotation with said member, a second sleeve surrounding the first mentioned sleeve, said sleeves having opposed thread-like grooves formed in their opposed surfaces, bearing elements received between said opposed grooves, and means frictionally cooperable with said second mentioned sleeve for urging it toward relative rotation with respect to the first mentioned sleeve.

5. In a servo mechanism, in combination with a rotatable member, an element rotatably and slidably associated with said member, an abutment on said member, an end of said element being formed complementary to said abutment for frictional engagement therewith, means constantly urging said element toward said abutment whereby to cause said end to interengage said abutment and frictionally lock it thereto for equal rotation therewith, a second element rotatably mounted on and axially movable with respect to the first mentioned element and cooperatively associated with the first mentioned independently of said means to affect relative axial dislacement between them upon relative rotation between them, and friction means cooperable with the last mentioned element for urging it toward relative rotation with respect to the first mentioned element.

6. In a clutch structure, in combination, a driving member, a driven member, a pressure plate rotatable with said driving member and axially movable with respect thereto, spring means urging said pressure plate toward clutch engaged position to clamp said driven member to said driving member, fingers associated with said pressure plate for moving it in opposition to said spring means, an element adapted to normally rotate with said driving member, a second element rotatable relative to the first mentioned element and cooperating therewith to be axially displaced relative thereto upon relative rotation between them, said second element cooperable with said fingers upon axial displacement in one direction relative to said first mentioned element to disengage said clutch, means frictionally associated with said second element to urge said second element toward relative rotation with respect to said first mentioned element, and means limiting movement of said friction means in one direction to an amount less than the corresponding maximum displacement of said fingers in the same direction.

7. In a clutch structure, in combination, a driving member, a driven member, a pressure plate rotatable with said driving member and axially movable with respect thereto, spring means urging said pressure plate toward clutch engaged position to clamp said driven member to said driving member, fingers associated with said pressure plate for moving it in opposition to said spring means, an element adapted to normally rotate with but rotatable relative to said driving element and axially movable with respect thereto, a second element rotatable relative to the first mentioned element and cooperating therewith to be axially displaced relative thereto upon relative rotation between them, said second element cooperable with said fingers upon axial displacement in one direction relative to said first mentioned element to disengage said clutch, and means frictionally associated with said second element to urge said second element toward relative rotation with respect to said first mentioned element.

8. In a clutch structure, in combination, a driving member, a driven member, a pressure plate rotatable with said driving member and axially movable with respect thereto, spring means urging said pressure plate toward clutch engaged position to clamp said driven member to said driving member, fingers associated with said pressure plate for moving it in opposition to said spring means, a sleeve fixed for rotation with said driving element, an element rotatably and axially slidably mounted relative to said sleeve and having frictional engagement therewith, a second element rotatable relative to the first mentioned element and adapted to be moved axially with respect thereto upon said relative rotation, said second element being associated with said fingers for corresponding movement in at least one direction, and means frictionally engageable with said second element for urging it toward relative rotation with respect to the first mentioned element.

9. In a clutch structure, in combination, a driving member, a driven member, a pressure plate adapted to clamp said driven member to said driving member, and means for releasing said pressure plate from clamping position including a pair of relatively rotatable members, means independent of said pressure plate frictionally urging one of said members for rotation with said driving member, said members having cooperating axially inclined surfaces, anti-friction members interposed between said inclined surfaces, and means for causing relative rotation between said relatively rotatable members including a friction brake associated with the other of said relatively rotatable members.

10. In a clutch structure, in combination, a driving element, a driven element, a pressure plate adapted to clamp said driven element to said driving element, spring means constantly urging said pressure plate toward said clamping position, a member frictionally urged toward equal rotation with said driving element, a second member relatively rotatable with respect to the first mentioned member, said members being so formed and so cooperating with each other that relative rotation between them effects axial advancement of said second member relative to the first mentioned member, means operatively connecting said second member and said pressure plate for correlated movements, a part axially and rotatably movable with said second member, a second non-rotatable part movable axially of said clutch and arranged for frictional engagement with the first mentioned part, and means for controlling the axial position of said second part.

11. In a clutch structure, in combination, a driving element, a driven element, a pressure plate adapted to clamp said driven element to said driving element, spring means constantly urging said pressure plate toward said clamping position, a member rotatably and axially slidably mounted relative to said driving element, means frictionally urging said member toward equal rotation with said driving element and limiting axial movement of said member in one direction, a second member relatively rotatable with respect to the first mentioned member, anti-friction means interposed between said members, said members being so formed and so cooperating with each other that relative rotation between them effects axial advancement of said second member relative to the first mentioned member, means operatively connecting said second member and said pressure plate for correlated movements, a part axially and rotatably movable with said second member, a second non-rotatable part movable axially of said clutch and arranged for frictional engagement with the first mentioned part, and means for controlling the axial position of said second part.

12. In a clutch structure, in combination, a driving element, a driven element, a pressure plate adapted to clamp said driven element to said driving element, spring means constantly urging said pressure plate toward said clamping position, a member rotatably and axially slidably mounted relative to said driving element, means including resilient means constantly urging said member toward one limit of its axially movable position and stop means limiting said axial movement in one direction for frictionally urging said member toward equal rotation with said driving element, a second member relatively rotatable with respect to the first mentioned member, anti-friction means interposed between said members, said members being so formed and so cooperating with each other that relative rotation between them effects axial advancement of said second member relative to the first mentioned member, means operatively connecting said second member and said pressure plate for correlated movements, a part axially and rotatably movable with said second member, a second non-rotatable part movable axially of said clutch and arranged for frictional engagement with the first mentioned part, and means for controlling the axial position of said second part.

13. In combination with a rotatable driving part, a driven part adapted for frictional engagement therewith, and a part constantly urged in a direction to clamp said driving and driven parts together for equal rotation and required to be actuated in an axial direction with respect thereto to release said frictional engagement, a member fixed for rotation with said driving part, an element rotatably mounted on said member, frictional means independent of the third mentioned part constantly urging said element toward equal rotation with said member, a second element rotatably associated with the first mentioned element and so constructed and arranged as to move axially relative to the first mentioned element upon relative rotation with respect thereto, means carried by said second element cooperable with the third mentioned part to effect axial displacement of said third mentioned part upon axial movement of said second element, and means for causing relative rotation between said elements.

14. In combination with a rotatable driving part and a part to be actuated in an axial direction with respect thereto, a member fixed for rotation with said driving part, an element rotatably mounted on said member, frictional means independent of the second mentioned part constantly urging said element toward equal rotation with said member, a second element rotatably associated with the first mentioned element and so constructed and arranged as to move axially relative to the first mentioned element upon relative rotation with respect thereto, means carried by said second element cooperable with the second mentioned part to effect axial displacement of said second mentioned part upon axial movement of said second element, and means arranged in axially follow-up relation with respect to said second element for controlling relative rotation between said elements.

15. In a clutch structure, in combination, a rotatable driving part, a driven part constantly urged toward frictional engagement therewith, means movable axially of said clutch for releasing said frictional engagement and means for moving the first mentioned means including, a pair of relatively rotatable members so constructed and arranged as to effect axial movement of one thereof with respect to the other thereof upon relative rotation between them, frictional means tending to maintain the normal position of one of said members but yieldable under abnormal forces present therein to permit shifting of said one of said members, and means under the manual control of the operator of said clutch for utilizing rotation of said driving member to effect relative rotation between said members.

ROBERT C. RUSSELL.

CERTIFICATE OF CORRECTION.

Patent No. 2,040,409.    May 12, 1936.

ROBERT C. RUSSELL.

It is hereby certified that error appears in the printed specification of the above numbered patent requiring correction as follows: Page 6, first column, line 55, claim 5, after "mentioned" insert the word element; and that the said Letters Patent should be read with this correction therein that the same may conform to the record of the case in the Patent Office.

Signed and sealed this 30th day of June, A. D. 1936.

Henry Van Arsdale

Acting Commissioner of Patents.

(Seal)